(12) United States Patent
Ohyama

(10) Patent No.: US 8,817,323 B2
(45) Date of Patent: Aug. 26, 2014

(54) IMAGE FORMING APPARATUS, IMAGE FORMING METHOD, AND COMPUTER PROGRAM PRODUCT

(75) Inventor: Tatsuo Ohyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 858 days.

(21) Appl. No.: 12/881,612

(22) Filed: Sep. 14, 2010

(65) Prior Publication Data

US 2011/0063680 A1    Mar. 17, 2011

(30) Foreign Application Priority Data

Sep. 15, 2009  (JP) .................. 2009-213573
Sep. 7, 2010   (JP) .................. 2010-200039

(51) Int. Cl.
| | |
|---|---|
| G06F 15/00 | (2006.01) |
| G06F 3/12 | (2006.01) |
| G06K 1/00 | (2006.01) |
| G06K 15/00 | (2006.01) |
| H04N 1/32 | (2006.01) |
| G06K 15/12 | (2006.01) |
| H04N 1/191 | (2006.01) |
| H04N 1/113 | (2006.01) |

(52) U.S. Cl.
CPC ....... *H04N 1/32561* (2013.01); *H04N 1/32593* (2013.01); *H04N 1/1911* (2013.01); *H04N 2201/04767* (2013.01); *H04N 1/1135* (2013.01); *H04N 1/1917* (2013.01); *H04N 2201/0091* (2013.01); *G06K 15/1219* (2013.01); *H04N 2201/0082* (2013.01); *G06K 15/129* (2013.01)
USPC ........... 358/1.5; 358/1.7; 358/1.15; 358/1.16; 358/1.17

(58) Field of Classification Search
USPC ........ 358/1.5, 1.6, 1.7, 3.26, 3.27, 1.13, 1.14, 358/1.15, 1.16, 1.17; 347/233, 234, 229, 347/240, 237, 247, 236
See application file for complete search history.

(56) References Cited

U.S. PATENT DOCUMENTS

| | | | |
|---|---|---|---|
| 6,268,929 B1* | 7/2001 | Ono ............................... 358/1.6 |
| 6,452,690 B1* | 9/2002 | Nakagawa .................... 358/1.15 |
| 6,621,592 B1* | 9/2003 | Takayama et al. ........... 358/1.16 |
| 7,471,411 B2* | 12/2008 | Takaki ......................... 358/1.15 |
| 2002/0051137 A1* | 5/2002 | Ema et al. ..................... 358/1.1 |
| 2003/0067533 A1* | 4/2003 | Omori et al. .................. 347/248 |
| 2006/0203262 A1* | 9/2006 | Ishikawa et al. .............. 358/1.7 |
| 2006/0203263 A1* | 9/2006 | Komiya et al. ............... 358/1.7 |
| 2007/0146738 A1* | 6/2007 | Nakajima ..................... 358/1.4 |
| 2009/0284788 A1* | 11/2009 | Shoji ............................ 358/1.15 |
| 2010/0239288 A1 | 9/2010 | Ohyama |

FOREIGN PATENT DOCUMENTS

JP    4217059    11/2008

\* cited by examiner

*Primary Examiner* — Firmin Backer
*Assistant Examiner* — Jonathan Beckley
(74) *Attorney, Agent, or Firm* — Oblon, Spivak, McClelland, Maier & Neustadt, L.L.P.

(57) ABSTRACT

An image forming apparatus includes: a request signal generating unit that generates a predetermined timing signal and transmits a request signal for a specified number of times for requesting line-by-line image data during a time interval at which the timing signal is generated; and a memory control unit that sequentially saves, in a memory unit, line-by-line image data transmitted in response to the request signal and reads line-by-line image data saved in the memory unit to transmit the line-by-line image data to a drive control unit. Upon receiving a predetermined increase request, the request signal generating unit shifts a generation timing of the timing signal so that, during the time interval, the request signal can be transmitted for an increased number of times than the specified number of times, and gradually shortens the timing signal by a predetermined shortening time period.

10 Claims, 10 Drawing Sheets

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-213573 filed in Japan on Sep. 15, 2009 and Japanese Patent Application No. 2010-200039 filed in Japan on Sep. 7, 2010.

BACKGROUND OF THE INVENTION

1. Field of the Invention

The present invention relates to an image forming apparatus, an image forming method, and a computer program product.

2. Description of the Related Art

In typical image forming apparatuses, a technology is commonly implemented in which a laser diode used as a light source emits laser light and the laser light is deflected by a polygon mirror so that a photosensitive element is main-scanned to be formed with a latent image. Particularly, in recent years, a technology has been known that makes use of a plurality of LDs, a laser diode array (LDS), or a vertical cavity surface emitting laser (VCSEL) for forming a latent image of a plurality of lines in a single scan.

For example, Japanese Patent Application Laid-open No. 2004-25828 discloses a technology in which, on the basis of a synchronization signal generated when a photoelectric conversion element (PD) detects the scanned laser light, a main-scanning synchronization signal (line data request signal) is generated with the purpose of determining an image data transfer timing to an image processing unit such as an application board that performs image processing, and thereby image data of a plurality of lines required to perform the writing operation in each scan is ontained.

In recent image forming apparatuses such as copying machines or printers in which the developer transferred onto a paper sheet gets fixed thereon by the application of heat, when images are printed on both sides of a paper sheet, the paper size before the application of heat is slightly different than the paper size after the application of heat, then the printed image on the front side and the printed image on the back side fall out of alignment. The reason for that is given below. After applying heat, the paper size undergoes slight shrinking as compared to the paper size before the application of heat. Thus, the printed image formed on the front side before the application of heat also undergoes shrinking. However, on top of that, another printed image is formed on the back side of the shrunken paper sheet thereby causing misalignment in the printed images.

In order to solve such a problem, a conventional technology is known in which magnification adjustment is done in the main-scanning direction as well as in the sub-scanning direction during the image processing performed by an image processing unit such as an application board. Alternatively, a conventional technology is known in which the magnification in the sub-scanning direction is adjusted by changing the rotating speed of the polygon mirror between both sides of a paper sheet and the magnification in the main-scanning direction is adjusted by performing data modulation or clock modulation using a write control unit. Still alternatively, a conventional technology is known in which the magnification in the sub-scanning direction is adjusted by the image processing performed by a write control unit without varying the rotating speed of the polygon mirror and the magnification in the main-scanning direction is adjusted by performing data modulation or clock modulation using the write control unit.

In such conventional technologies, particularly in image forming apparatuses in which images are reduced in size by means of thinning; all the data needs to be transferred sooner than normal from an image processing unit such as an application board. That requirement is met by increasing the number of line data request signals as requests for image data output to the image forming unit during a predetermined time period equivalent to a single scan.

However, due to various factors such as an increase in the print speed, an increase in the number of write lines during a single scan leading to an increase in the number of requests for the obtained image data during a predetermined time period, or a demand for slowing down the transfer rate of the image data obtained during a predetermined period time; the increased line data request signal output to the image forming unit overlaps into the subsequent predetermined time period thereby causing failure in the data transfer. That leads to the deterioration in the image quality.

SUMMARY OF THE INVENTION

It is an object of the present invention to at least partially solve the problems in the conventional technology.

According to an aspect of the present invention there is provided an image forming apparatus including: a light source that emits a light beam; a drive control unit that controls the light source; a light receiving unit that receives the light beam emitted by the light source; an image processing unit that performs image processing on image data based on the light beam received by the light receiving unit; a memory unit that stores image data; a request signal generating unit that generates a predetermined timing signal and transmits, to the image processing unit, a request signal for a specified number of times as requests for line-by-line image data during a predetermined time period that corresponds to a time interval at which the timing signal is generated; and a memory control unit that sequentially saves, in the memory unit, line-by-line image data transmitted by the image processing unit in response to the request signal and reads line-by-line image data saved in the memory unit to transmit the line-by-line image data to the drive control unit. Upon receiving a predetermined increase request, the request signal generating unit shifts a generation timing of the timing signal so that, during the predetermined time period, the request signal can be transmitted for an increased number of times than the specified number of times, and gradually shortens the timing signal by a predetermined shortening time period.

According to another aspect of the present invention there is provided an image forming method executed in an image forming apparatus. The image forming apparatus includes: a light source that emits a light beam; a drive control unit that controls the light source; a light receiving unit that receives the light beam emitted by the light source; an image processing unit that performs image processing on image data based on the light beam received by the light receiving unit; and a memory unit that stores image data. The image forming method includes: request-signal-generating that includes generating a predetermined timing signal and transmitting, to the image processing unit, a request signal for a specified number of times as requests for line-by-line image data during a predetermined time period that corresponds to a time interval at which the timing signal is generated; and memory-controlling that includes sequentially saving, in the memory unit, line-by-line image data transmitted by the image processing unit in response to the request signal, and reading line-by-line image data saved in the memory unit and transmitting the line-by-line image data to the drive control unit. Upon receiving a predetermined increase request, the request-signal-generating includes shifting a generation timing of the timing signal so that, during the predetermined time period, the request signal can be transmitted for an increased number of times than the specified number of times, and gradually shortening the timing signal by a predetermined shortening time period.

According to still another aspect of the present invention there is provided a computer program product including a computer-usable medium having computer-readable program codes. The program codes when executed cause a computer to execute an image forming method using an image forming apparatus. The image forming apparatus includes: a light source that emits a light beam; a drive control unit that controls the light source; a light receiving unit that receives the light beam emitted by the light source; an image processing unit that performs image processing on image data based on the light beam received by the light receiving unit; and a memory unit that stores image data. The image forming method includes: request-signal-generating that includes generating a predetermined timing signal and transmitting, to the image processing unit, a request signal for a specified number of times as requests for line-by-line image data during a predetermined time period that corresponds to a time interval at which the timing signal is generated; and memory-controlling that includes sequentially saving, in the memory unit, line-by-line image data transmitted by the image processing unit in response to the request signal, and reading line-by-line image data saved in the memory unit and transmitting the line-by-line image data to the drive control unit. Upon receiving a predetermined increase request, the request-signal-generating includes shifting a generation timing of the timing signal so that, during the predetermined time period, the request signal can be transmitted for an increased number of times than the specified number of times, and gradually shortening the timing signal by a predetermined shortening time period.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus, an image forming method, and a computer program product according to the present invention are described in detail below with reference to the accompanying drawings. The present invention is not limited to these exemplary embodiments.

Figure 1:
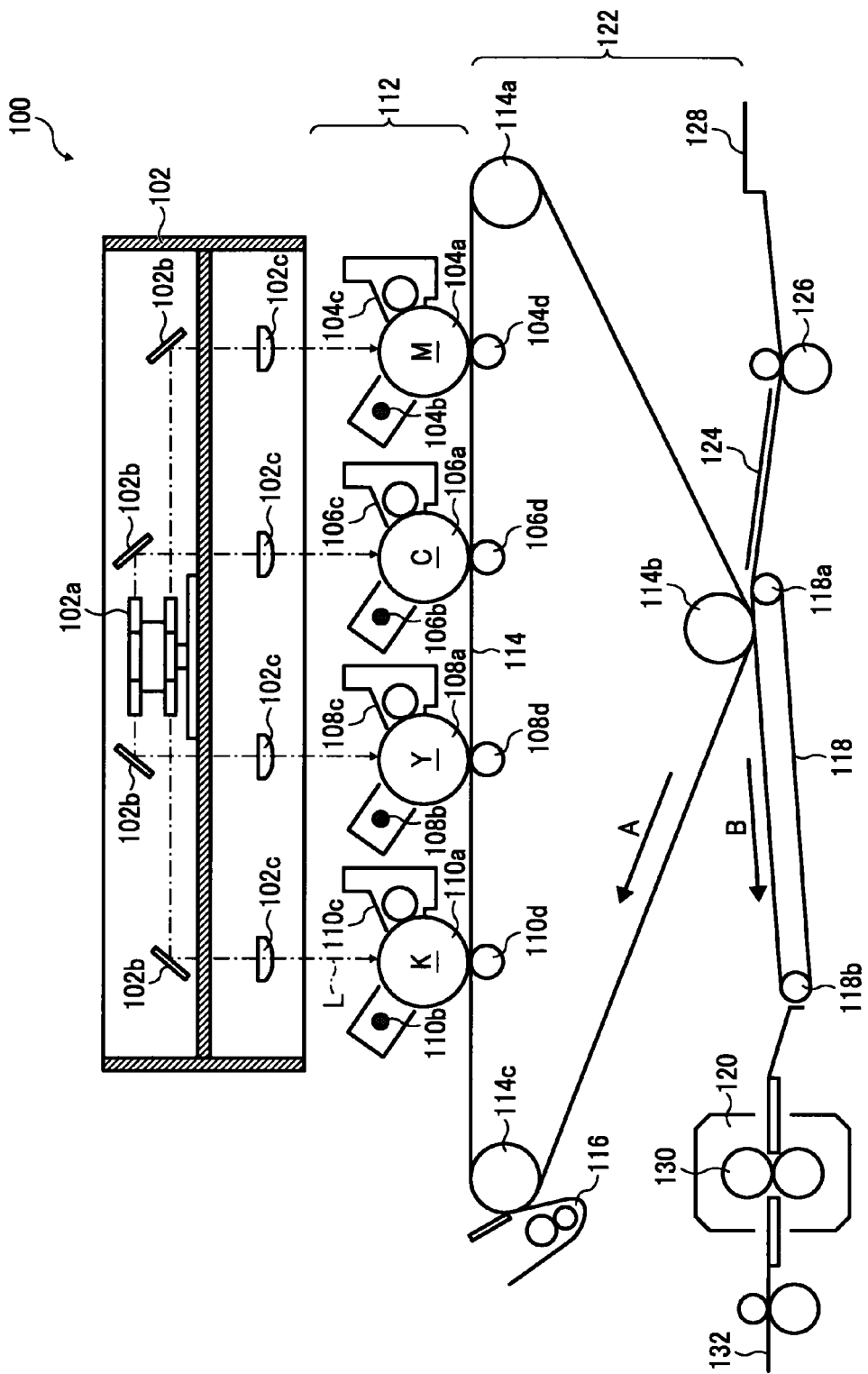
FIG. 1 is a schematic diagram of an image forming apparatus according to an embodiment of the present invention.

FIG. 1 is a schematic diagram of an exemplary mechanical configuration of an image forming apparatus according to an embodiment of the present invention. An image forming apparatus 100 according to the present invention includes a VCSEL 200 (see FIGS. 2 and 3); an optical device 102 having an optical element such as a polygon mirror 102a; an image forming unit 112 having drum-shaped photosensitive elements, a charging device, and a developing device; and a transfer unit 122 having an intermediate transfer belt. The optical device 102 includes the VCSEL 200 as a semiconductor laser. In the present embodiment illustrated in FIG. 1, the optical beam emitted by the VCSEL 200 (not illustrated in FIG. 1) is once collected by a first cylindrical lens (not illustrated) before being deflected by the polygon mirror 102a toward a reflecting mirror 102b.

Figure 2:
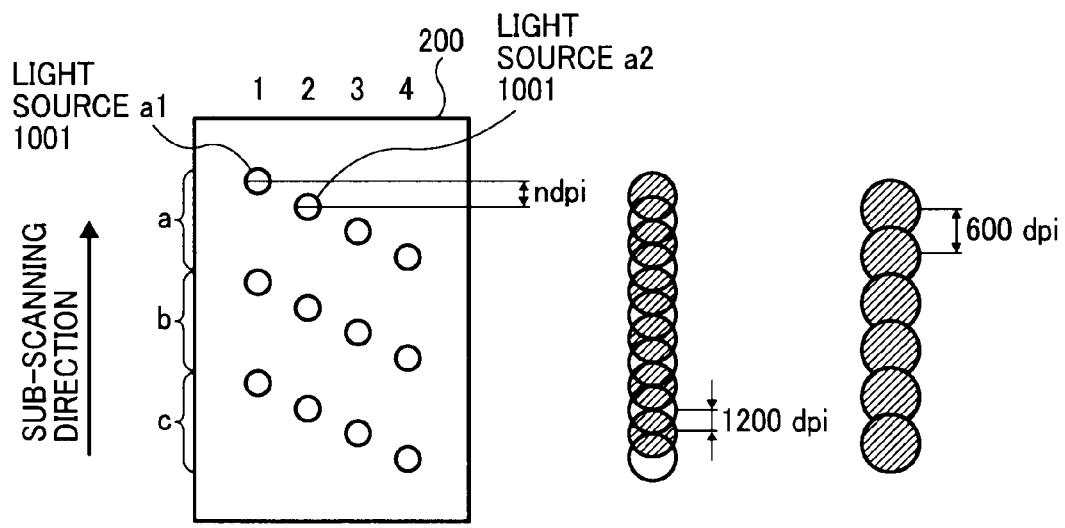
FIG. 2 is a configuration diagram of an exemplary configuration when a light source unit according to the present embodiment is composed of a semiconductor laser array or a VCSEL.

The VCSEL 200 is a vertical cavity surface emitting laser having a plurality of light sources (semiconductor lasers) arranged in a grid-like pattern on a single chip. Various technologies are known regarding image forming apparatuses including a VCSEL such as the VCSEL 200. In the optical device 102 in the image forming apparatus 100 according to the present embodiment, the VCSEL 200 is installed with an identical configuration to that in the known technologies. FIG. 2 is a configuration diagram of the VCSEL 200 installed in the optical device 102 according to the present embodiment. As illustrated in FIG. 2, the VCSEL 200 is composed of a semiconductor laser array in which a plurality of light sources 1001 (a plurality of semiconductor lasers) are arranged in a grid-like manner.

The columns of the light sources in the semiconductor laser array are referred to by letters a to c, while the rows are referred to by numbers 1 to 4. Moreover, for example, the top-left light source 1001 is referred to as a light source a1 and so on. By arranging the light sources 1001 at shifted positions along the sub-scanning direction, the light source a1 illuminates a different scanning position than a neighboring light source a2 by means of interlaced scanning. Herein, consider a case when those two light sources form a single pixel (one pixel). That is, consider a case when one pixel is formed from two light sources illustrated in FIG. 2. For example, the two light sources a1 and a2 form one pixel, two light sources a3 and a4 form one pixel, and so on. In that case, the light sources illustrated in FIG. 2 go on forming the pixels as illustrated on the right hand side. Assuming that the vertical direction in FIG. 2 is the sub-scanning direction, the center-to-center spacing of the pixels, each formed by two light sources, corresponds to about 600 dots per inch (dpi). At that time, the central clearance of two light sources forming one pixel (i.e., ndpi in FIG. 2) corresponds to about 1200 dpi. Thus, the light source density is twice that of the pixel density. Because of that, by varying the light intensity ratio of each pair of light sources forming one pixel, the position of the gravity center of the pixels can be shifted in the sub-scanning direction thereby making it possible to obtain high-precision images. Meanwhile, the VCSEL 200 illustrated in FIG. 2 can also be configured in an non-uniform manner in which the central clearance for the light sources is set to 2400 dpi while setting the same to 4800 dpi for some light sources in the central part.

In the present embodiment, light beams L are emitted corresponding to the number of colors of cyan (C), magenta (M), yellow (Y), and black (K). The light beam L is reflected from the reflecting mirror 102b before being recollected by a second cylindrical lens 102c. The recollected light is made to fall on drum-shaped photosensitive elements 104a, 106a, 108a, and 110a.

As described above, the light beams L are irradiated using a plurality of optical components and timing synchronization with respect to the main-scanning direction and the sub-scanning direction are performed. In the following description, the main-scanning direction is set as the scanning direction of the light beam and the sub-scanning direction is set as the direction perpendicular to the main-scanning direction.

The drum-shaped photosensitive elements 104a, 106a, 108a, and 110a each include a conductive drum, made of for example aluminum, and at least a photoconductive layer including a charge generating layer and a charge transporting layer formed on the conductive drum. The photoconductive layers are arranged for the drum-shaped photosensitive elements 104a, 106a, 108a, and 110a, and are applied with a surface charge by charging units 104b, 106b, 108b, and 110b, respectively, each including a corotron, a scorotron, a charging roller, or the like.

The static charge applied to the drum-shaped photosensitive elements 104a, 106a, 108a, and 110a by the charging units 104b, 106b, 108b, and 110b, respectively, is subjected to image-wise exposure by the light beam L, so that an electrostatic latent image is formed on each of the drums-shaped photosensitive elements 104a, 106a, 108a, and 110a. The latent images are then developed by developing units 104c, 106c, 108c, and 110c, respectively, each including a developing sleeve, a developer supplying roller, and a regulation blade. As a result, a developer image is formed on each of the drum-shaped photosensitive elements 104a, 106a, 108a, and 110a.

The developer images carried on the drum-shaped photosensitive elements 104a, 106a, 108a, and 110a are then transferred onto an intermediate transfer belt 114, which moves in the direction of an arrow A due to the rotation of conveying rollers 114a, 114b, and 114c. While carrying a developer image of cyan, magenta, yellow, and black colors, the intermediate transfer belt 114 is conveyed to a secondary transfer unit that includes a secondary transfer belt 118 and conveying rollers 118a and 118b. The secondary transfer belt 118 moves in the direction of an arrow B due to the rotation of conveying rollers 118a and 118b. To the secondary transfer unit, a image receiving material 124 such as a high-quality paper sheet or a plastic sheet is supplied from a image receiving material container 128 such as a paper cassette due to the rotation of a conveying roller 126.

The secondary transfer unit applies a secondary transfer bias for transferring the multicolor developer image from the intermediate transfer belt 114 onto the image receiving material 124 that is retained on the secondary transfer belt 118 by being sucked. Then, along with the movement of the secondary transfer belt 118, the image receiving material 124 is conveyed to a fixing device 120 that includes a fixing member 130 such as a fixing roller including silicon rubber or fluorine-contained rubber. The fixing member 130 applies pressure and heat to the image receiving material 124 on which the multicolor developer image has been transferred. Subsequently, the image receiving material 124 is output as a printed material 132 to the outside of the image forming apparatus 100. From the intermediate transfer belt 114 from which the multicolor developer image has been transferred, a cleaning unit 116 including a cleaning blade removes the residual developing material so that the intermediate transfer belt 114 becomes ready for the subsequent image forming operation.

Figure 3:
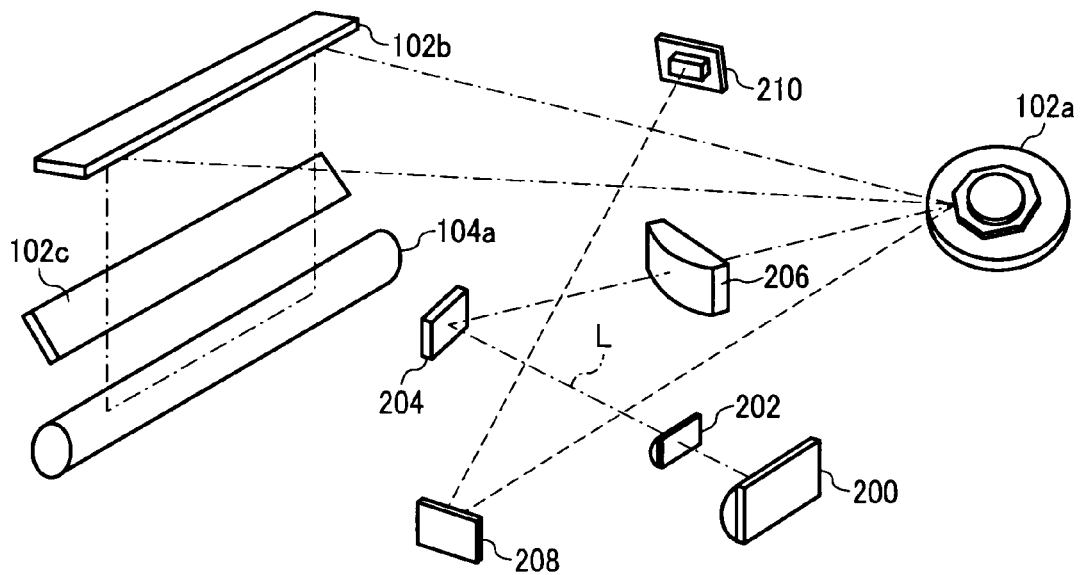
FIG. 3 is a schematic perspective view of a case when an optical device including a VCSEL illuminates a drum-shaped photosensitive element according to the present embodiment.

FIG. 3 is a schematic perspective view of a case when the optical device 102 including the VCSEL 200 illuminates the drum-shaped photosensitive element 104a. The light beam L emitted by the VCSEL 200 is collected by a first cylindrical lens 202 that is disposed to shape an optical light bundle. Then, the collected light gets reflected from a reflecting mirror 204 and passes through an imaging lens 206 before being deflected by the polygon mirror 102a, which is rotary-driven by, for example, a spindle motor rotating for several thousand times to several tens of thousand times. The light beam L deflected by the polygon mirror 102a is reflected from the reflecting mirror 102b before being reshaped by the second cylindrical lens 102c. The reshaped light is made to fall on the drum-shaped photosensitive element 104a.

Meanwhile, a reflecting mirror 208 is disposed with the purpose of synchronizing the scan start timing of the light beam L in the sub-scanning direction. Before the start of the scanning in the sub-scanning direction, the light beam L is reflected from the reflecting mirror 208 toward a synchronization detecting device 210 that includes a photodiode or the like. Upon detecting the light beam L, the synchronization detecting device 210 generates a synchronization signal (DETP_N) for the purpose of starting the sub-scanning and synchronizes operations such as an operation for generating a drive control signal meant for the VCSEL 200.

The VCSEL 200 is driven by a pulse signal transmitted from a write control unit 310 (described later) and, as described later, forms an electrostatic latent image on the drum-shaped photosensitive element 104a by exposing the positions corresponding to predetermined image bits in image data to the light beam L.

Figure 4:
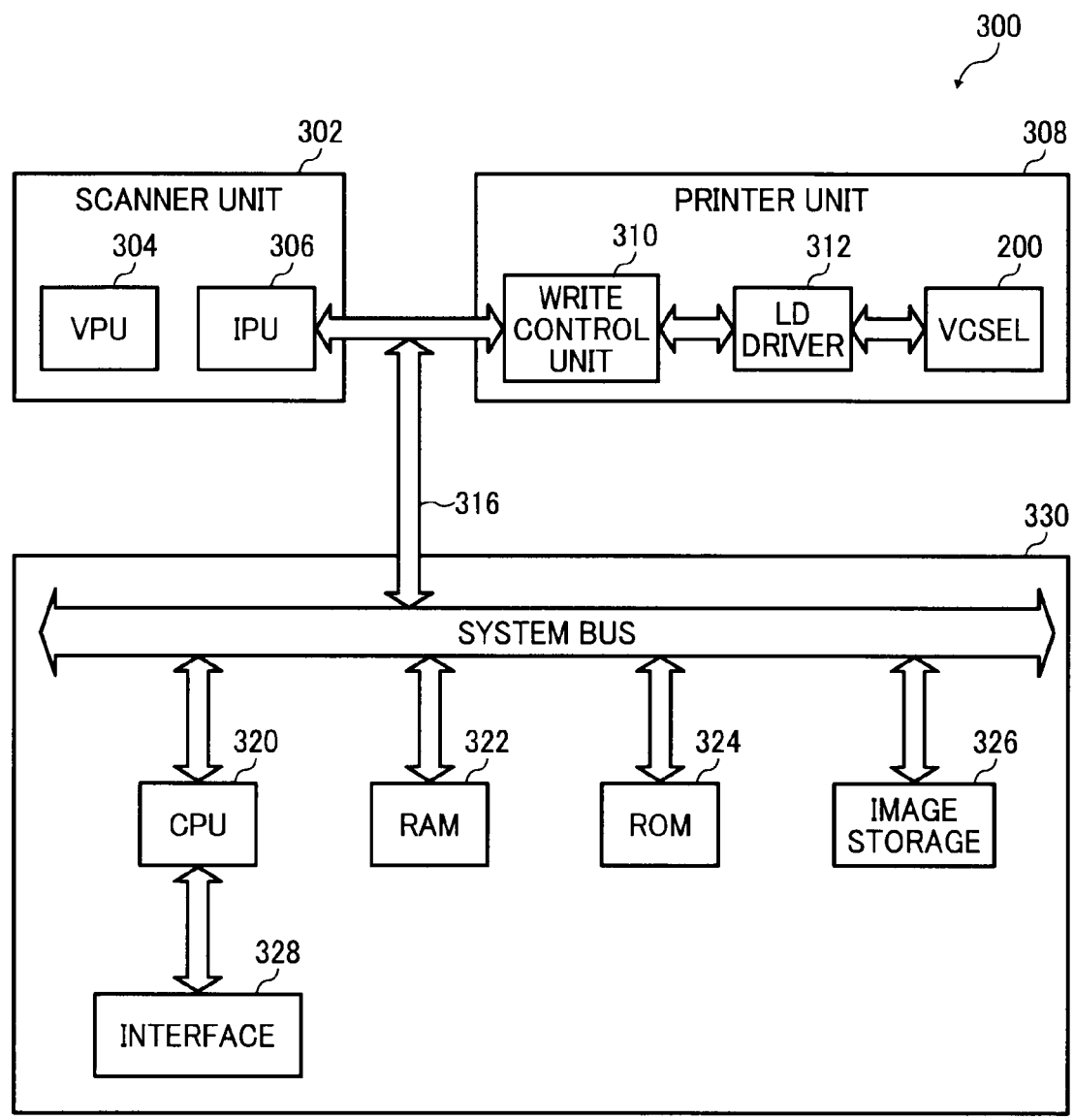
FIG. 4 is a schematic functional block diagram of a control unit disposed in the image forming apparatus according to the present embodiment.

FIG. 4 is a schematic functional block diagram of a control unit 300 disposed in the image forming apparatus 100. The control unit 300 includes a scanner unit 302, a printer unit 308, and a main control unit 330. The scanner unit 302 functions as an image reading unit, and includes a VPU 304 for performing black offset correction, shading correction, and pixel position correction as well as includes an IPU 306 for performing image processing with the main purpose of digitally converting the obtained image data from the RGB color coordinate system into the MYK color coordinate system. The images read by the scanner unit 302 are sent as digital data to the printer unit 308.

The printer unit 308 includes the write control unit 310 functioning as a control unit for drive-controlling the VCSEL 200, an LD driver 312 for supplying to the semiconductor laser elements an electric current to be used in driving those semiconductor laser elements in response to the drive control signal generated by the write control unit 310, and the VCSEL 200 in which the semiconductor laser elements are two-dimensionally arranged. With respect to the image data sent by the scanner unit 302, the write control unit 310 according to the embodiment performs high resolution processing by dividing the pixel data so as to conform with the spatial sizes of the semiconductor laser elements that emit light from the VCSEL 200 is obtained.

The scanner unit 302 and the printer unit 308 are connected to the main control unit 330 via a system bus 316. Herein, the image reading operation and the image forming operation are controlled according to the instructions issued by the main control unit 330. The main control unit 330 includes a central processing unit (CPU) 320 and a random access memory (RAM) 322 that provides a work space for the CPU 320 to carry out the processing. Any known CPU may be used as the CPU 320 and the CPU 320 can have different processing architectures, such as the complex instruction set computing (CISC) architecture, such as a PENTIUM (registered trademark) processor or a processor compatible thereto, or the reduced instruction set computing (RISC) architecture, such as MIPS. Upon receiving a user instruction via an interface 328, the CPU 320 calls program modules for executing the operation corresponding to the user instruction and ensures that operations such as copying, facsimileing, scanning, and image storing are performed. Meanwhile, the main control unit 330 includes a read only memory (ROM) 324 for storing the initial setting data of the CPU 320, storing the control data, and storing computer programs in a usable manner for the CPU 320. An image storage 326 is configured as a fixed-type or an attachable-detachable-type memory device such as a hard disk drive (HDD), a secure digital (SD) card, or a universal serial bus (USB) memory. In the image storage 326, the image data obtained by the image forming apparatus 100 is stored in a usable manner at the time of performing various user operations.

Regarding the image data obtained by the scanner unit 302, in the case of driving the printer unit 308 and forming an electrostatic latent image on the drum-shaped photosensitive element 104a, the CPU 320 performs the main-scanning direction control and the sub-scanning position control for the image receiving material such as a high-quality paper sheet or a plastic sheet. At the time of starting the scanning in the sub-scanning direction, the CPU 320 outputs a start signal to the write control unit 310. Once the write control unit 310 receives the start signal, the IPU 306 starts the scanning operation. Subsequently, the write control unit 310 receives the image data stored in a buffer memory or the like, processes the received image data, and outputs the processed image data to the LD driver 312. Upon receiving the processed image data, the LD driver 312 generates a drive control signal meant for the VCSEL 200 and outputs that drive control signal to the VCSEL 200 so that the VCSEL 200 emits light. Besides, the LD driver 312 drives the semiconductor laser elements using the pulse-width modulation (PWM) control. In the present embodiment, although it is assumed that eight channels of the semiconductor laser elements are present, the number of channels is not limited to eight.

Figure 5:
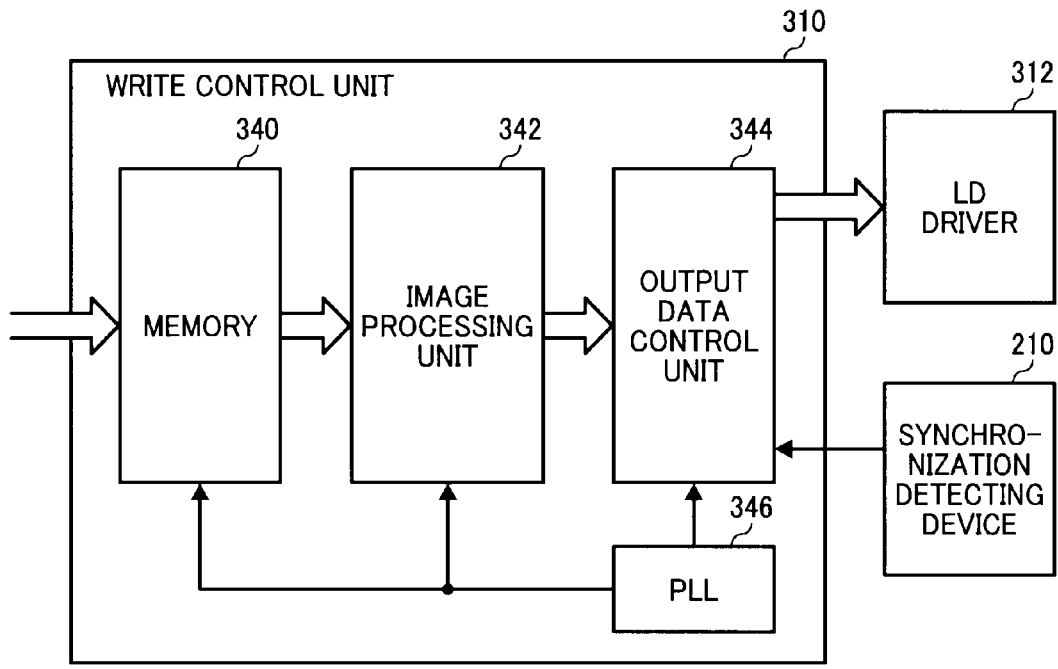
FIG. 5 illustrates a detailed functional configuration of a write control unit according to the present embodiment.

FIG. 5 illustrates a detailed functional configuration of the write control unit 310. In the write control unit 310, a memory 340 functions as a first-in first-out (FIFO) buffer or the like for receiving the synchronization signal (DETP_N) and for storing the image data sent by the IPU 306. In the write control unit 310, the image data sent by the IPU 306 is transferred to an image processing unit 342 via the memory 340. The image processing unit 342 reads the image data from the memory 340 and performs operations such as image data resolution conversion, allotment of semiconductor laser element channels, and addition/deletion of image bits. Regarding the image data, the positions at which the drum-shaped photosensitive element 104a is exposed to light are decided according to a main-scanning line address value defined in the main-scanning direction and a sub-scanning line address value defined in the sub-scanning direction.

An output data control unit 344 performs operations on the basis of the synchronization signal (DETP_N) generated when the synchronization detecting device 210 detects the light beam emitted by the VCSEL 200. More particularly, with a write start signal (not illustrated) as the trigger, the output data control unit 344 outputs a line data request signal (MLSYNC_N) for requesting the image processing unit 342 to transfer raster data. Besides, the output data control unit 344 transmits to the LD driver 312 the drive control signal and the write image data meant for the VCSEL 200.

Figure 6:
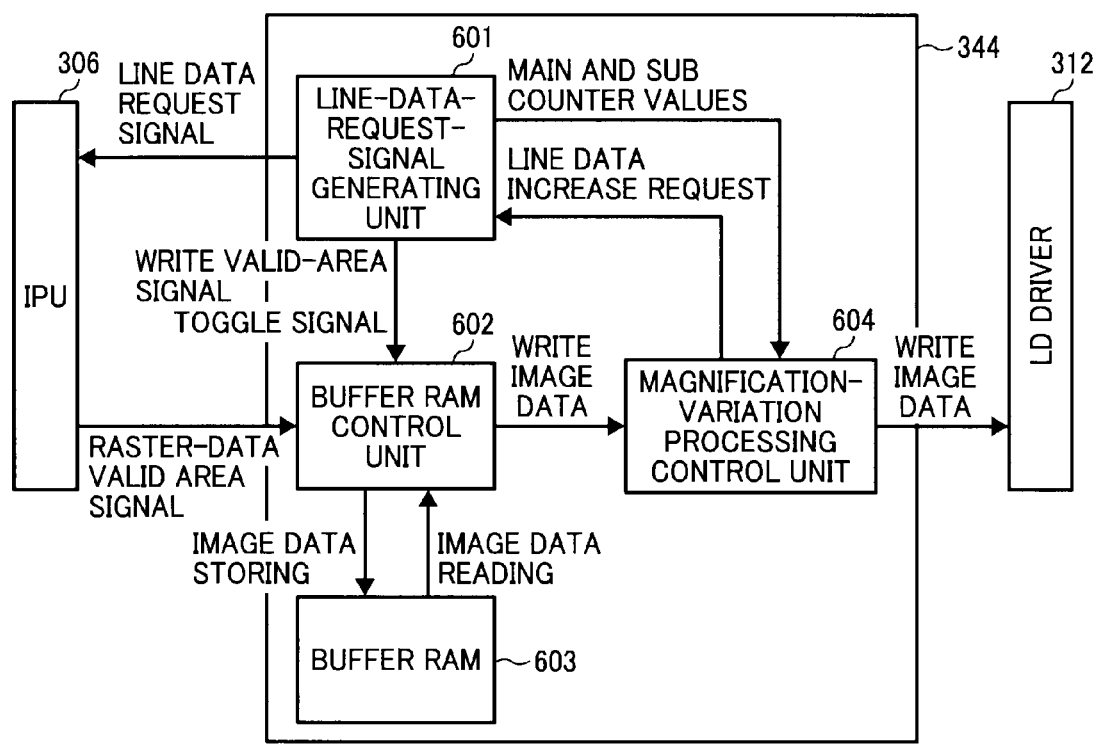
FIG. 6 illustrates a detailed functional configuration of an output data control unit according to the present embodiment.

FIG. 6 illustrates a detailed configuration of the output data control unit 344. As illustrated in FIG. 6, the output data control unit 344 mainly includes a line-data-request-signal generating unit 601, a buffer RAM control unit 602, a magnification-variation processing control unit 604, and a buffer RAM 603.

The buffer RAM 603 is used to store the raster data.

The line-data-request-signal generating unit 601 generates, on the basis of the synchronization signal, a toggle signal that is a timing signal corresponding to a predetermined time period and a write valid-area signal indicating the valid write area, and transmits the toggle signal and write valid-area signal to the buffer RAM control unit 602. Besides that, on the basis of the toggle signal, the line-data-request-signal generating unit 601 generates a line data request signal (MLSYNC_N) and transmits it to the IPU 306. Herein, the interval at which the toggle signal (TOGGLE) is regenerated corresponds to the predetermined time period.

In response to the received line data request signal (MLSYNC_N), the IPU 306 outputs to the output data control unit 344 the line-by-line raster data and a valid area signal indicating that the raster data is valid.

From the IPU 306, the buffer RAM control unit 602 receives the valid area signal and the raster data that corresponds to the valid area and that is transferred on a line-by-line basis. The buffer RAM control unit 602 sequentially stores the raster data on a line-by-line basis in the buffer RAM 603. Besides, during the time period between two adjacent asserts of the toggle signal, the buffer RAM control unit 602 reads the stored data from the buffer RAM 603, which is not targeted for writing, according to the write valid-area signal and then transmits the read data as write image data to the magnification-variation processing control unit 604.

Subsequently, the magnification-variation processing control unit 604 receives input of main and sub counter values from the line-data-request-signal generating unit 601, performs image processing of varying the magnification of the write image data supplied from the buffer RAM control unit 602, and outputs the write image data, of which magnification is varied, to the LD driver 312. Moreover, before the write image data supplied from the buffer RAM 603 runs short, the magnification-variation processing control unit 604 transmits a line-data-increase request signal to the line-data-request-signal generating unit 601 depending on the magnification ratio settings for magnification variation.

Figure 7:
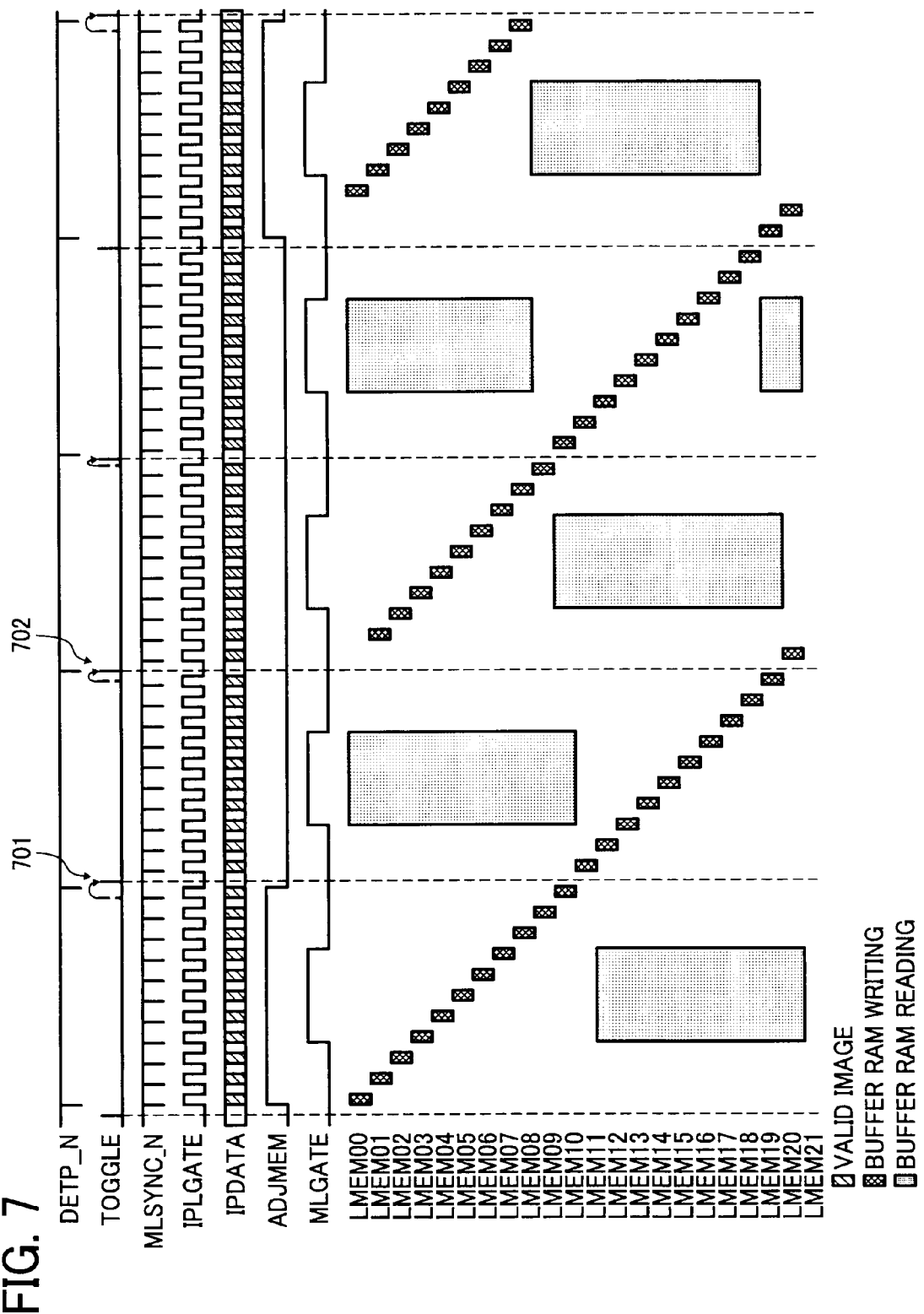
FIG. 7 is an exemplary timing chart according to the present embodiment.

Given below is the more specific explanation with reference to a timing chart. FIG. 7 is an exemplary timing chart of data writing.

The example illustrated in FIG. 7 is given for the case when writing is usually performed using the raster data of 10 lines in a single scan and when the line-data-increase request signal is generated after every four scans.

As illustrated in FIG. 7, on the basis of the synchronization signal (DETP_N), the line-data-request-signal generating unit 601 generates the toggle signal (TOGGLE) corresponding to a predetermined time period at a timing (see reference numeral 701) at which the line data request signal (MLSYNC_N), which corresponds to the predetermined time period in which the line-data-increase request signal (ADJMEM) is asserted, is produced for 11 times that is one time more than the usual 10 times.

Then, during the time period until the raster data (IPDATA) of the 11-th time is stored in the buffer RAM 603 (i.e., until the valid area signal (IPLGATE) of the 11-th time is negated), the line-data-request-signal generating unit 601 delays the subsequent toggle signal (TOGGLE) by a time period β (time period γ) without performing assertion (see reference numeral 702).

In this way, by shortening the subsequent predetermined time period and beyond, the assertion position of the toggle signal gradually returns to the normal assertion position.

The buffer RAM control unit 602 stores the raster data (IPDATA), which is sequentially input on a line-by-line basis, in line memories (LMEM00 to LMEM21) in the buffer RAM 603 in a sequential manner at the timings of the IPLGATE signal. Besides, during the assertion period of the write valid-area signal (MLGATE) and during the time period in which the toggle signal (TOGGLE) gets asserted, the buffer RAM control unit 602 reads the raster data from those line memories in the buffer RAM 603 that are not targeted for writing and transmits the read data as write image data to the magnification-variation processing control unit 604.

Figure 8:
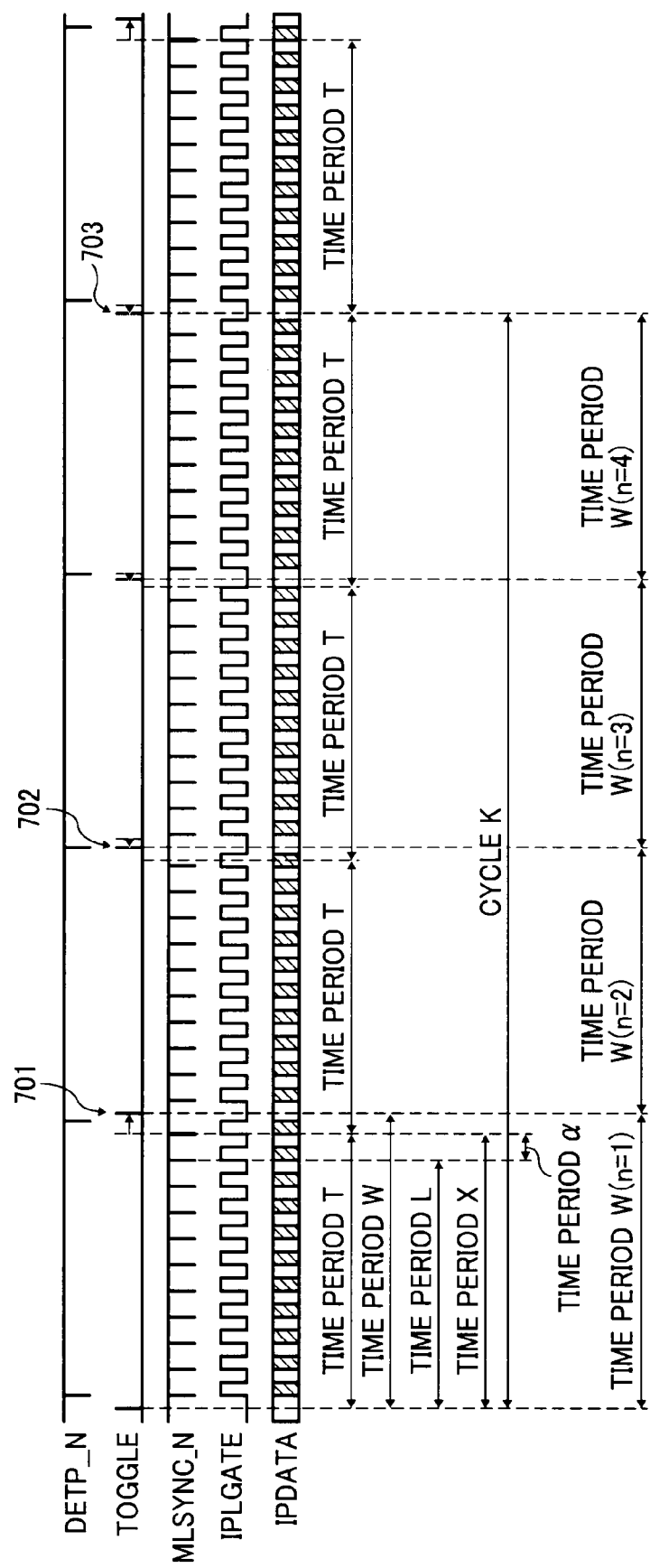
FIGS. 8 and 9 are timing charts with detailed illustration than given in FIG. 7.
Figure 9:
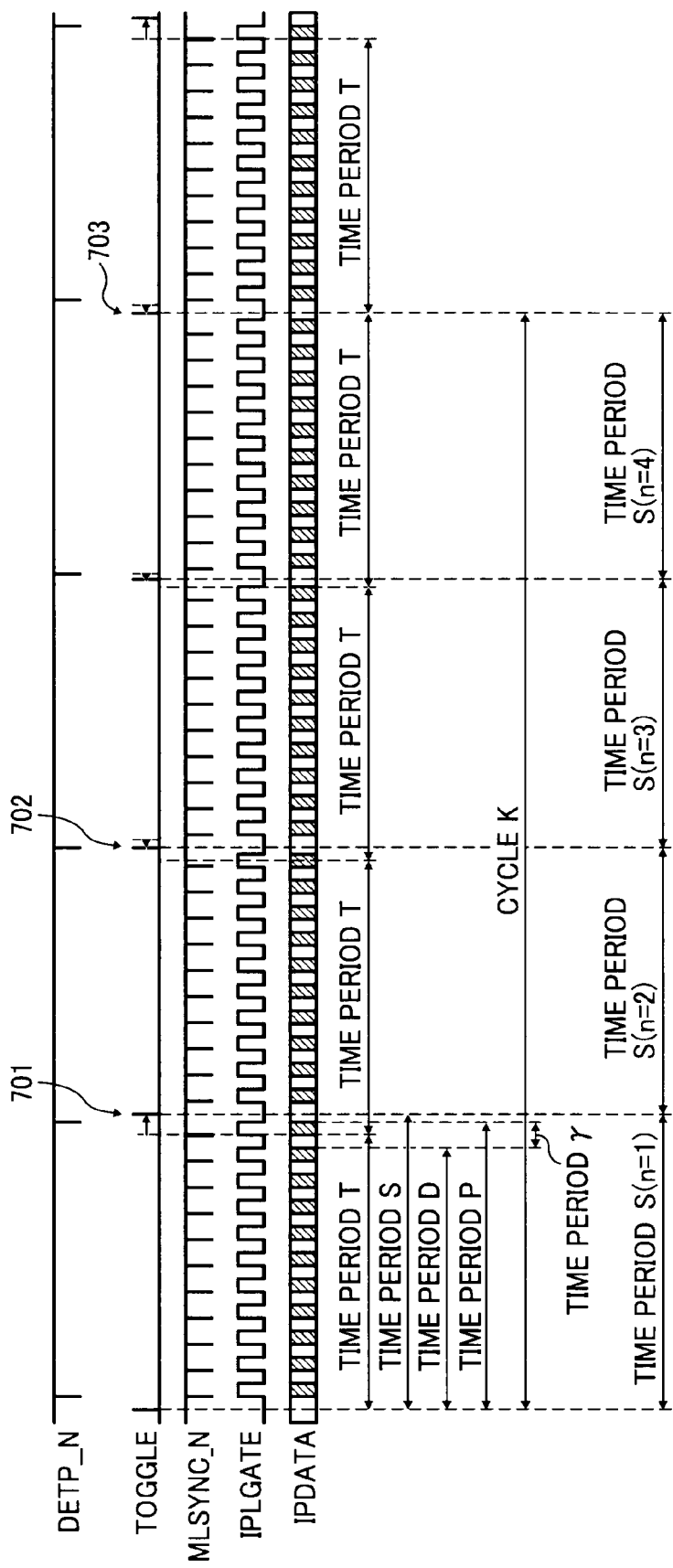

The abovementioned operation is described below in detail. FIGS. 8 and 9 are timing charts with more detailed illustration as compared to FIG. 7.

Herein, in a predetermined time period T, the line-data-request-signal generating unit 601 generates the line data request signal (MLSYNC_N) for N number of times as the specified number of times and, upon receiving input of the line-data-increase request signal (ADJMEM), generates the data request signal (MLSYNC_N) for N+1 number of times.

As illustrated in FIG. 8, if the generation timing of the N+1-th line data request signal (MLSYNC_N) falls beyond the time period T; then the line-data-request-signal generating unit 601 generates a toggle signal (TOGGLE) for extending the time period T to a time period W that includes the generation timing of the N+1-th line data request signal (MLSYNC_N) (see reference numeral 701).

In that case, by sequentially storing the raster data equivalent to N+1 number of lines within the time period W in the buffer RAM 603 and by reading the raster data from the buffer RAM 603 that is not targeted for writing during the time period W, the buffer RAM control unit 602 separates the write control and the read control performed while accessing the buffer RAM 603.

The line-data-request-signal generating unit 601 generates the toggle signal (TOGGLE) in such a way that each time period T subsequent to the time period W gradually goes on shortening by the time period β in order to return to the length of the predetermined time period T (see reference numerals 702 and 703).

Herein, assume that a time period L represents the time period (second time period) from the start of the time period T up to the generation of the line data request signal (MLSYNC_N) for N number of times, assume that a time period X represents the time period (first time period) from the start of the time period T up to the generation of the line data request signal (MLSYNC_N) for N+1 number of times, and assume that a cycle K (K being an integer equal to or larger than 1) represents a number of scans between subsequent generations of the line data request signal for the N+1 number of times. Under such assumptions, the shortening time period β as the amount of gradual shortening can be expressed as given below in Equation (1).

$$\beta=(X-L)/(K-1) \tag{1}$$

where, W−T=X−L.

Thus, the line-data-request-signal generating unit 601 gradually shortens the toggle signal (TOGGLE) by a time period β calculated by first obtaining the difference between the first time period X, from the start of the time period T up to the generation of the request signal for N+1 number of times that is one time more than the specified N number of times, and the second time period L, from the start of the time period T up to the generation of the request signal for the specified N number of times, and then dividing that difference by the value obtained by subtracting one from the cycle K, which represents the number of scans between subsequent generations of the request signal for the subsequent N+1 number of times.

Meanwhile, if the time periods W during the cycle K are referred to as time periods W(n), then each time period W(n) can be expressed as given below in Equations (2-1) and (2-2).

$$W(1)=T+\alpha \tag{2-1}$$

$$W(n)=T-\beta \tag{2-2}$$

where, α=X−L, n=2, 3, , K.

Thus, the line-data-request-signal generating unit 601 generates the toggle signal (TOGGLE) in such a way that the time period W(1) during the cycle K is equal to the time period obtained by adding the difference between the first time period X and the second time period L to the time period T. Moreover, the line-data-request-signal generating unit 601 generates the toggle signal (TOGGLE) in such a way that the time period W(n) (n=2, 3, , K) during the cycle K is equal to the time period obtained by subtracting the shortening time period β from the time period T.

A sum total of the predetermined time periods T during the cycle K satisfies below Equation (3).

$$K*T=\Sigma W(n)+W(1) \tag{3}$$

where, n=2, 3, , K.

Thus, the line-data-request-signal generating unit 601 generates the toggle signal (TOGGLE) in such a way that the sum total of the predetermined time periods T during the cycle K is equal to the summation of each time period W(n) and the time period W(1) during the cycle K.

In the buffer RAM 603, the buffer RAM control unit 602 sequentially stores the line-by-line raster data equivalent to N number of lines according to the line data request signals (MLSYNC_N). Upon generation of the line-data-increase request signal (ADJMEM), if the period until the buffer RAM control unit 602 stores the raster data input at the generation timing of the N+1-th line data request signal (MLSYNC_N) in the buffer RAM 603 falls beyond the time period T as illustrated in FIG. 8; then the line-data-request-signal generating unit 601 generates a toggle signal (TOGGLE) for extending the time period T to a time period S that includes the period until the buffer RAM control unit 602 stores the N+1-th raster data in the buffer RAM 603.

Thus, by sequentially storing the raster data equivalent to N+1 number of lines within the time period S in the buffer RAM 603 and by reading the raster data from the buffer RAM 603 that is not targeted for writing during the time period S, the buffer RAM control unit 602 separates the write control and the read control in access of the buffer RAM 603. The line-data-request-signal generating unit 601 generates the toggle signal (TOGGLE) in such a way that each time period T subsequent to the time period S gradually goes on shortening by a time period δ to return to the length of the predetermined time period T.

Assume that a time period D represents the time period from the start of the time period T up to the end of storing the N-th raster data in the buffer RAM 603 and assume that a time period P represents the time period from the start of the time period T up to the end of storing the N+1-th raster data in the buffer RAM 603. Under such assumptions, the time period δ can be expressed as given below in Equation (4) by making use of the cycle K (K being an integer equal to or larger than 1), which represents the number of scans between subsequent generations of the line data request signal for the N+1 number of times.

$$\delta = (P-D)/(K-1) \quad (4)$$

where, S−T=P−D.

Meanwhile, if the time periods S during the cycle K are referred to as time periods S(n), then each time period S(n) can be expressed as given below in Equations (5-1) and (5-2).

$$S(1) = T + \gamma \quad (5\text{-}1)$$

$$S(n) = T - \delta \quad (5\text{-}2)$$

where, γ=P−D, n=2, 3, , K.

Moreover, the sum total of the predetermined time periods T during the cycle K satisfies below Equation (6).

$$K^*T = \Sigma S(n) + S(1) \quad (6)$$

where, n=2, 3, , K.

Thus, the line-data-request-signal generating unit 601 generates the toggle signal (TOGGLE) at the timings satisfying Equations (1) to (6).

Herein, the line-data-request-signal generating unit 601 generates the toggle signal in such a way that the time period D, which represents the time period from the start of the time period T up to the end of storing the N-th raster data in the buffer RAM 603, becomes equal to the first time period X and in such a way that the time period P, which represents the time period from the start of the time period T up to the end of storing the N+1-th raster data in the buffer RAM 603, becomes equal to the second time period L. Hence, Equations (4) to (6) as well as Equations (1) to (3) get equivalently satisfied.

Figure 10:
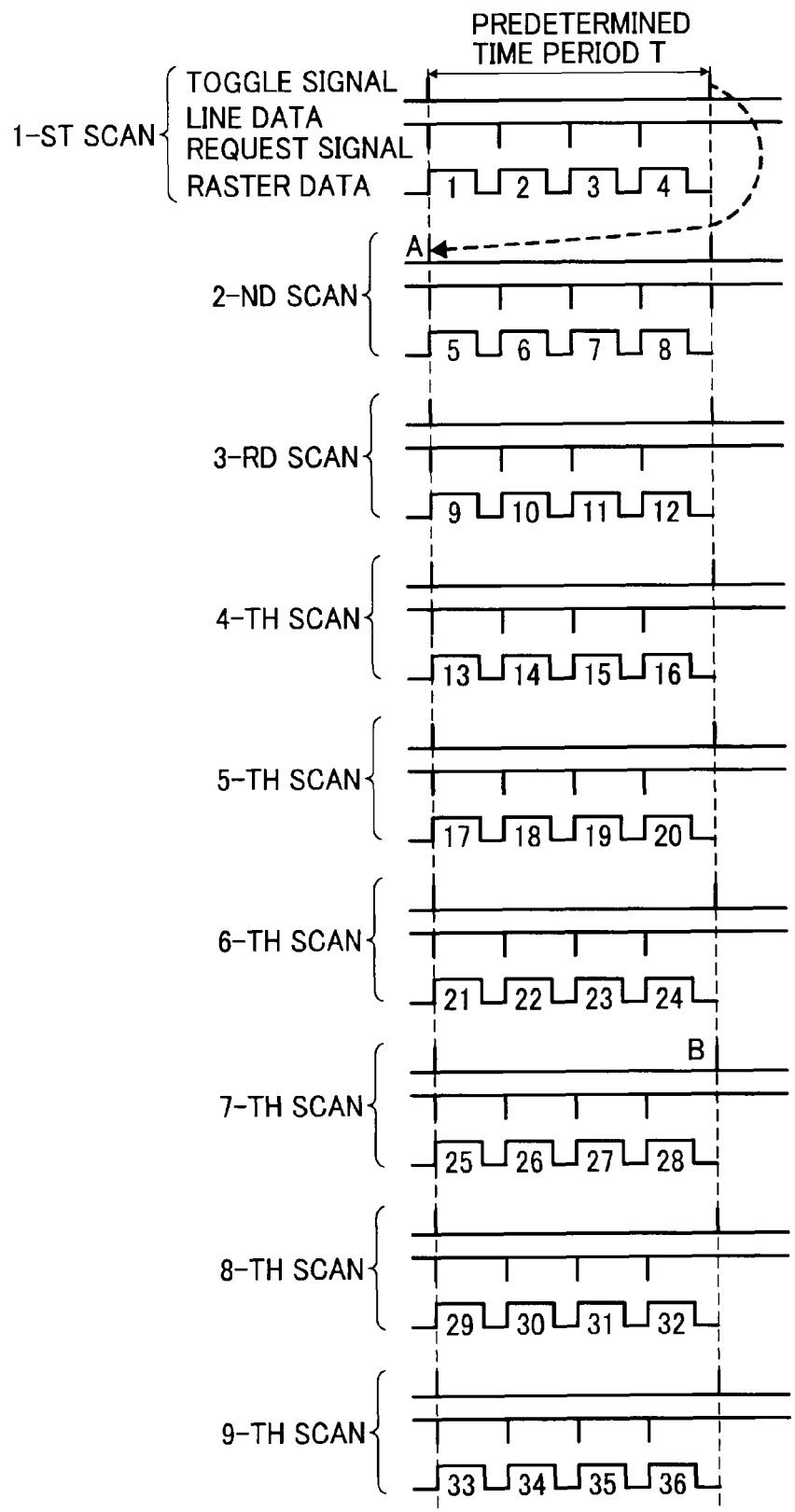
FIGS. 10 and 11 are writing timing charts in a conventional image forming apparatus.
Figure 11:
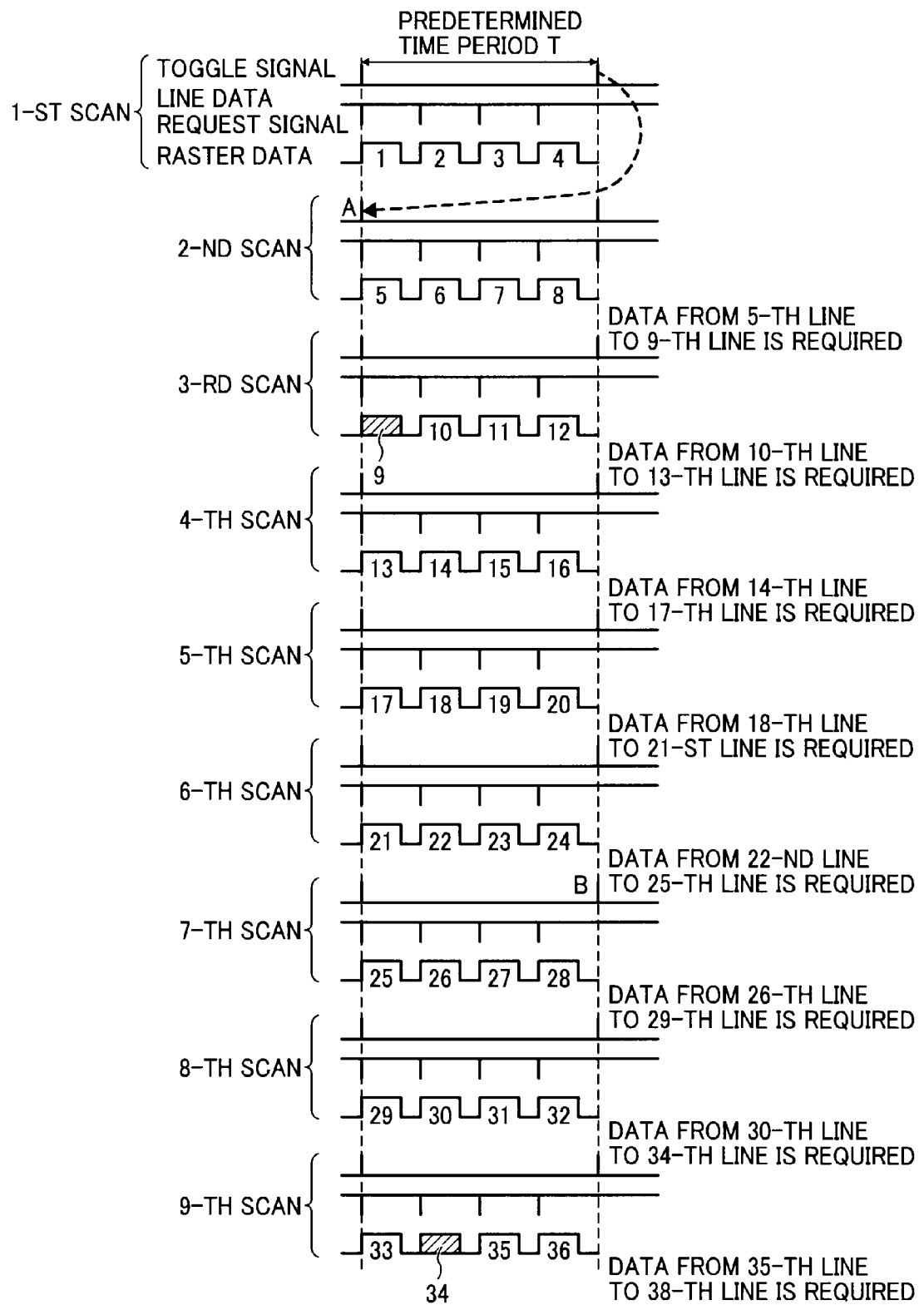

Consider a conventional image forming apparatus in which, as illustrated in FIG. 10, either the number of line data request signals is not increased during the predetermined time period equal to a single scan. Alternatively, consider a conventional image forming apparatus in which, irrespective of increasing the number of line data request signals during the predetermined time period as illustrated in FIG. 11, following factors make an impact: an increase in the print speed, an increase in the number of write lines during a single scan leading to an increase in the number of requests for the obtained image data during a predetermined time period, or a demand for slowing down the transfer rate of the image data obtained during a predetermined period time. In such image forming apparatuses, the increased line data request signal output to the image forming unit overlaps into the subsequent predetermined time period thereby causing failure in the data transfer.

Figure 12:
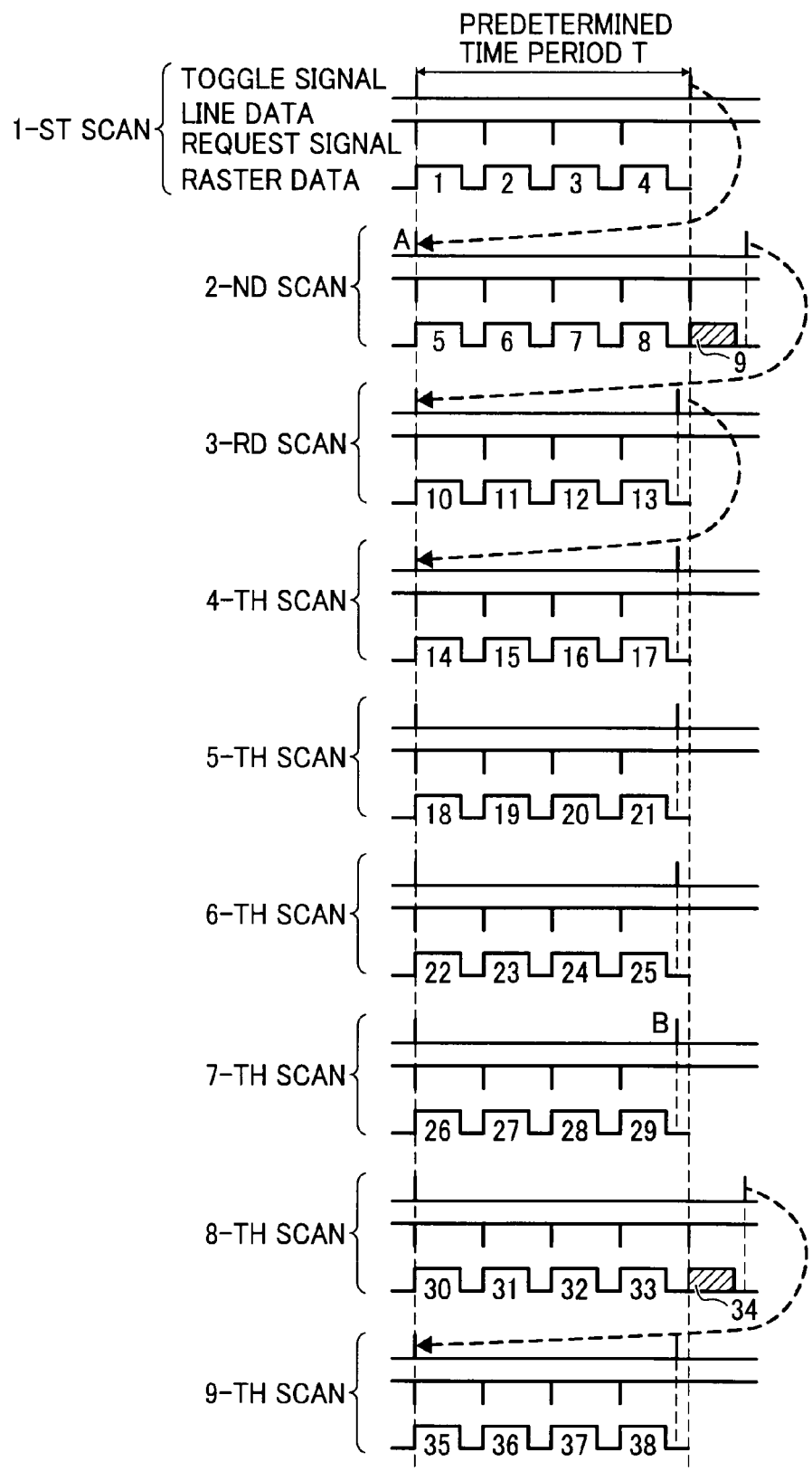
FIG. 12 is a writing timing chart in the image forming apparatus according to the present embodiment.

In contrast, in the present embodiment, the toggle signal is generated so that the number of line data request signals during the predetermined time period can be increased and the timing of regenerating the toggle signal is gradually shortened so as to return to the timing to the original timing as illustrated in FIG. 12. Hence, even if the increased line data request signal output to the image processing unit 342 overlaps into the subsequent predetermined time period, the data transfer encounters no failure thereby making it possible to obtain high-quality images.

In the present embodiment, the explanation is given with reference to the VCSEL 200 as the light source for emitting light beams. However, the embodiment is not limited to that case and it is possible to use any kind of light source that can emit a plurality of light beams.

Meanwhile, an image forming program executed in the image forming apparatus (including a multifunction peripheral (MFP)) according to the present embodiment is stored in advance in a ROM or the like for distribution.

Alternatively, the image forming program executed in the image forming apparatus according to the present embodiment can be provided in the form of an installable file or an executable file on a computer-readable storage device such as a compact disk read only memory (CD-ROM), a flexible disk (FD), a compact disk recordable (CD-R), or a digital versatile disk (DVD).

Still alternatively, the image forming program executed in the image forming apparatus according to the present embodiment can be saved on a computer connected to a network such as the Internet and can be downloaded therefrom via the network. Still alternatively, the image forming program executed in the image forming apparatus according to the present embodiment can be made available for distribution through a network such as the Internet.

The image forming program executed in the image forming apparatus according to the present embodiment contains modules for the abovementioned constituent units (the image processing unit 342, the line-data-request-signal generating unit 601, the buffer RAM control unit 602, and the magnification-variation processing control unit 604). In practice, a CPU (processor), which is an actual hardware, retrieves the image forming program from the ROM and executes the same so that the abovementioned constituent units (the image processing unit 342, the line-data-request-signal generating unit 601, the buffer RAM control unit 602, and the magnification-variation processing control unit 604) are loaded in the main memory device and put into practice in the main memory device.

According to an aspect of the present invention, even if the increased line data request signal output from a write control unit overlaps into the subsequent predetermined time period, the data transfer encounters no failure and it becomes possible to obtain high-quality images because of a highly accurate alignment of the image forming positions on both sides.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
a light source configured to emit a light beam;
drive control circuitry configured to control the light source;
a light receiving device configured to receive the light beam emitted by the light source;
image processing circuitry configured to perform image processing on image data based on the light beam received by the light receiving device; and
data control circuitry, comprising request signal generating circuitry, memory control circuitry, and a memory, the memory being configured to store image data, the request signal generating circuitry being configured to transmit a timing signal to the memory control circuitry, and to transmit a request signal to the image processing circuitry, the timing signal being regenerated at a first time interval, the request signal being generated for a first plurality of times as requests for a first plurality of line-by-line image data during the first time interval, the memory control circuitry being configured to sequentially save in the memory the requested first plurality of line-by-line image data transmitted by the image processing circuitry in response to the request signal, to read the first plurality of line-by-line image data saved in the memory, and to transmit the first plurality of line-by-line image data to the drive control circuitry, wherein, before an interruption in the first plurality of line-by-line image data transmitted to the drive control circuitry, the request signal is generated for a second plurality of times as requests for a second plurality of line-by-line image data, the second plurality of times being at least one time greater than the first plurality of times, and the second plurality of line-by-line image data being greater than the first plurality of line-by-line image data, wherein, when the request signal is generated for the second plurality of times, the regeneration of the timing signal is shifted, and the request signal generating circuitry regenerates the timing signal at a second time interval until the memory control circuitry sequentially saves in the memory the requested second plurality of line-by-line image data, the second time interval being greater than the first time interval, and wherein, after the memory control circuitry sequentially saves in the memory the requested second plurality of line-by-line image data, the request signal generating circuitry regenerates the timing signal at the second time interval, wherein a length of the second time interval is gradually shortened until the second time interval is equal to the first time interval.

2. The image forming apparatus according to claim 1, wherein the request signal generating circuitry regenerates the timing signal at the second time interval in such a way that the memory control circuitry finishes saving, in the memory, the requested second plurality of line-by-line image data, and wherein the requested second plurality of line-by-line image data is transmitted by the image processing circuitry in response to the request signal being generated for the second plurality of times.

3. The image forming apparatus according to claim 2, wherein an amount of the gradual shortening of the length of the second time interval is calculated by first obtaining a difference between a first time period taken from a start of the first time interval up to generation of the request signal for one time more than the first plurality of times, and a second time period taken from the start of the first time interval up to generation of the request signal for the first plurality of times, and then dividing the difference by a value obtained by subtracting one from a cycle, the cycle representing a number of iterations of time periods between subsequent requests for the second plurality of line-by-line image data after the second time interval is shortened to equal the first time interval.

4. The image forming apparatus according to claim 3, wherein the request signal generating circuitry generates the timing signal in such a way that an initial length of the second time interval during the cycle and before the gradual shortening is equal to a sum of the first time period and the difference, and each subsequent length of the second time interval during the cycle and during the gradual shortening is equal to the first time period minus the calculated amount of the gradual shortening.

5. The image forming apparatus according to claim 4, wherein the request signal generating circuitry generates the timing signal in such a way that a sum total of a length of time periods during the cycle is equal to a summation of said each subsequent length of the second time interval and the initial length of the second time interval during the cycle.

6. The image forming apparatus according to claim 3, wherein the first time period includes a time period from the start of the first time interval up to a point of time when the memory control circuitry finishes saving, in the memory, image data that is transmitted by the image processing circuitry in response to the request signal generated for one time more than the first plurality of times, and wherein the second time period includes a time period from the start of the first time interval up to a point of time when the memory control circuitry finishes saving, in the memory, image data that is transmitted by the image processing circuitry in response to the request signal generated for the first plurality of times.

7. The image forming apparatus according to claim 1, wherein the memory control circuitry reads line-by-line image data other than the image data sequentially stored in the memory.

8. The image forming apparatus according to claim 1, wherein the light source is a surface emitting laser.

9. An image forming method executed in an image forming apparatus comprising a light source configured to emit a light beam, drive control circuitry configured to control the light source, a light receiving device configured to receive the light beam emitted by the light source, image processing circuitry configured to perform image processing on image data based on the light beam received by the light receiving device, and data control circuitry including request signal generating circuitry, memory control circuitry, and a memory, the method comprising:

transmitting a timing signal from the request signal generating circuitry to the memory control circuitry, the timing signal being regenerated at a first time interval;

transmitting a request signal from the request signal generating circuitry to the image processing circuitry, the request signal being generated for a first plurality of times as requests for a first plurality of line-by-line image data during the first time interval;

sequentially saving in the memory, using the memory control circuitry, the requested first plurality of line-by-line image data transmitted by the image processing circuitry in response to the request signal;

reading the first plurality of line-by-line image data saved in the memory, using the memory control circuitry; and transmitting the first plurality of line-by-line image data from the memory control circuitry to the drive control circuitry, wherein, before an interruption in the first plurality of line-by-line image data transmitted to the drive control circuitry, the request signal is generated for a second plurality of times as requests for a second plurality of line-by-line image data, the second plurality of times being at least one time greater than the first plurality of times, and the second plurality of line-by-line image data being greater than the first plurality of line-by-line image data,
wherein, when the request signal is generated for the second plurality of times, the regeneration of the timing signal is shifted, and the request signal generating circuitry regenerates the timing signal at a second time interval until the memory control circuitry sequentially saves in the memory the requested second plurality of line-by-line image data, the second time interval being greater than the first time interval, and
wherein, after the memory control circuitry sequentially saves in the memory the requested second plurality of line-by-line image data, the request signal generating circuitry regenerates the timing signal at the second time interval, wherein a length of the second time interval is gradually shortened until the second time interval is equal to the first time interval.

10. A non-transitory computer readable storage medium having executable instructions stored therein, which when executed cause a computer to execute an image forming method using an image forming apparatus comprising a light source configured to emit a light beam, drive control circuitry configured to control the light source, a light receiving device configured to receive the light beam emitted by the light source, image processing circuitry configured to perform image processing on image data based on the light beam received by the light receiving device, and data control circuitry including request signal generating circuitry, memory control circuitry, and a memory, the method comprising:
   transmitting a timing signal from the request signal generating circuitry to the memory control circuitry, the timing signal being regenerated at a first time interval;
   transmitting a request signal from the request signal generating circuitry to the image processing circuitry, the request signal being generated for a first plurality of times as requests for a first plurality of line-by-line image data during the first time interval;
   sequentially saving in the memory, using the memory control circuitry, the requested first plurality of line-by-line image data transmitted by the image processing circuitry in response to the request signal;
   reading the first plurality of line-by-line image data saved in the memory, using the memory control circuitry; and
   transmitting the first plurality of line-by-line image data from the memory control circuitry to the drive control circuitry,
wherein, before an interruption in the first plurality of line-by-line image data transmitted to the drive control circuitry, the request signal is generated for a second plurality of times as requests for a second plurality of line-by-line image data, the second plurality of times being at least one time greater than the first plurality of times, and the second plurality of line-by-line image data being greater than the first plurality of line-by-line image data,
wherein, when the request signal is generated for the second plurality of times, the regeneration of the timing signal is shifted, and the request signal generating circuitry regenerates the timing signal at a second time interval until the memory control circuitry sequentially saves in the memory the requested second plurality of line-by-line image data, the second time interval being greater than the first time interval, and
wherein, after the memory control circuitry sequentially saves in the memory the requested second plurality of line-by-line image data, the request signal generating circuitry regenerates the timing signal at the second time interval, wherein a length of the second time interval is gradually shortened until the second time interval is equal to the first time interval.

* * * * *